Nov. 11, 1969   K. L. CRABTREE   3,477,564
MOLDED CONTAINER POSITIONER
Filed Sept. 28, 1967   2 Sheets-Sheet 1
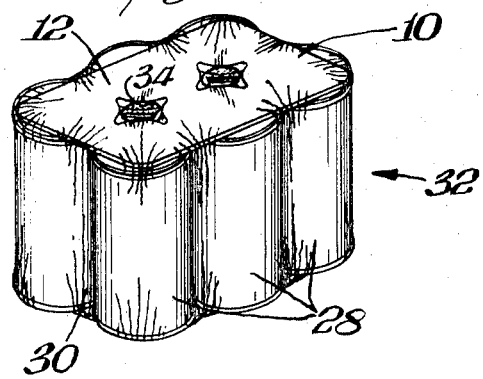
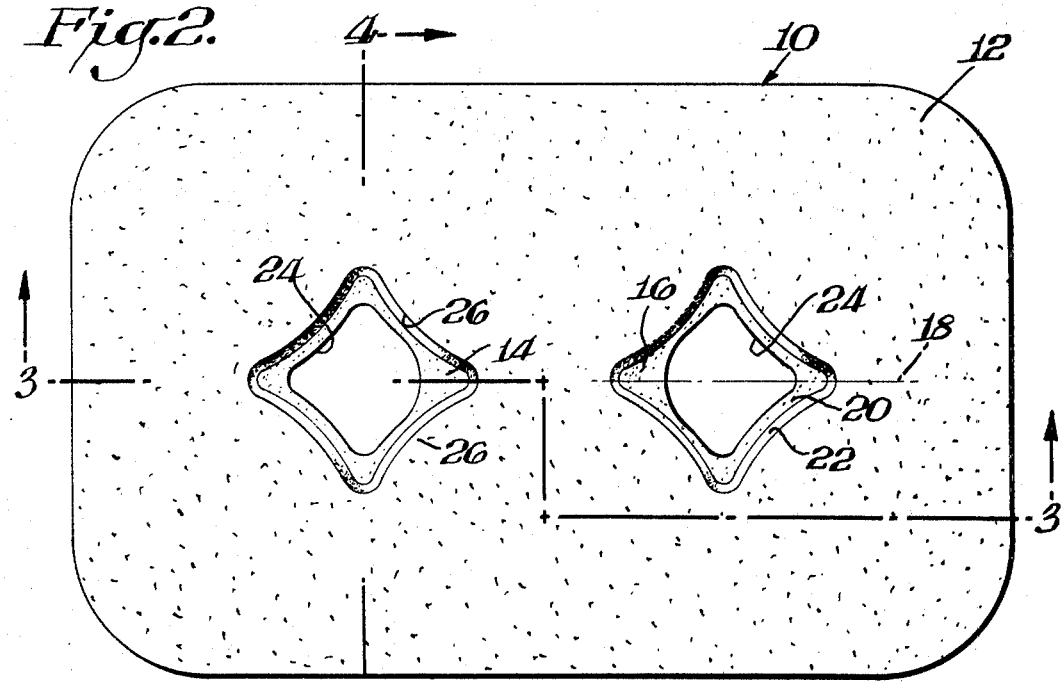
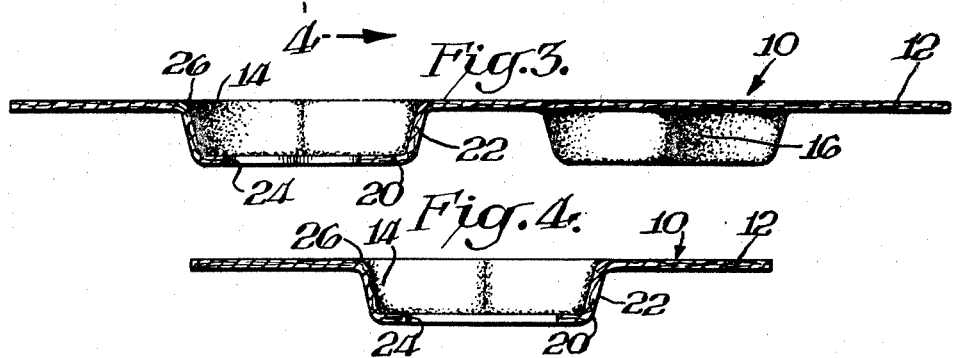

Nov. 11, 1969  K. L. CRABTREE  3,477,564
MOLDED CONTAINER POSITIONER
Filed Sept. 28, 1967
2 Sheets-Sheet 2
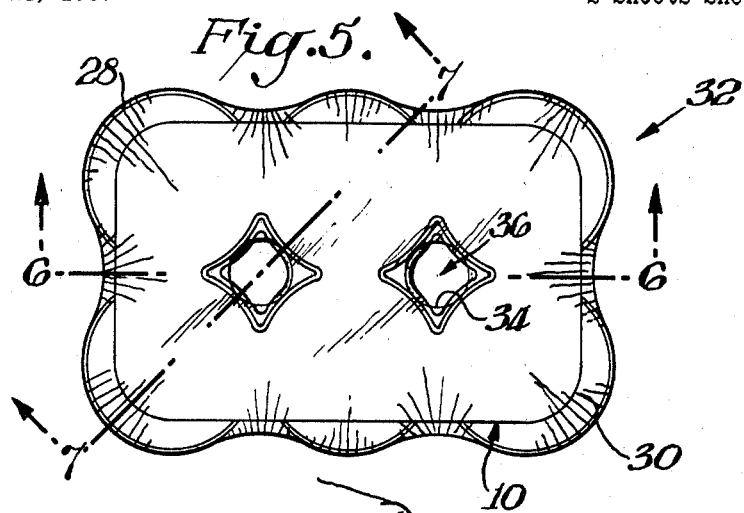
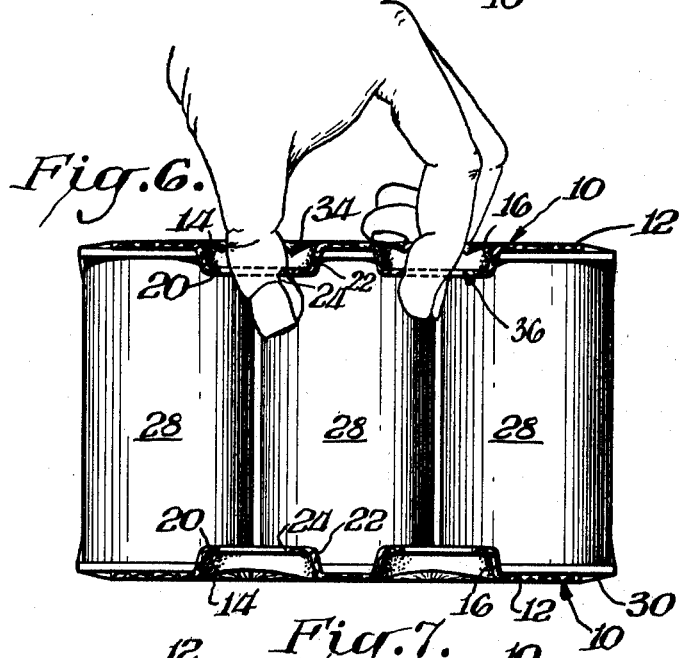
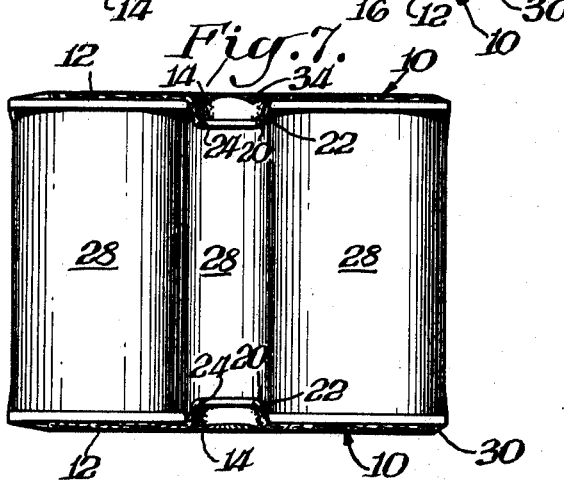

United States Patent Office 3,477,564
Patented Nov. 11, 1969

3,477,564
MOLDED CONTAINER POSITIONER
Kenneth L. Crabtree, Fairfield, Maine, assignor to Keyes Fibre Company, Waterville, Maine, a corporation of Maine
Filed Sept. 28, 1967, Ser. No. 674,082
Int. Cl. B65d 71/00
U.S. Cl. 206—65    4 Claims

ABSTRACT OF THE DISCLOSURE

Packages comprising six similar cylindrical containers in two parallel rows of three containers each with an upper positioner adjacent the tops of the containers and, in many instances, a lower positioner adjacent the container bottoms. Each positioner includes a sheet of generally rectangular overall configuration having a pair of integrally molded depressions formed therein with each depression extending into the interior of the package between a group of four adjacent containers. An outerwrap of heat shrinkable flexible transparent film surrounds the upper and lower positioners and the containers confined therebetween.

BACKGROUND OF THE INVENTION

The present invention relates to a unitary molded article for packaging plural containers, and more particularly to a relatively inexpensive molded article for positioning cylindrical containers in a package.

Presently, many consumer products packaged in cylindrical containers are conveniently sold in units of six. Six-packs of beer, soft drinks, and dog food, for example, are but a few of the vast number of products commercialized in this highly successful and popular packaging form. Numerous designs have been proposed over the years for packaging such products, and of the many materials suggested for this type of packaging, the low cost and other inherent advantages of fibrous pulp and plastic materials make them extremely popular choices.

Multiple container packages, such as disclosed in Billingsley Patent 3,206,020 dated Sept. 14, 1965, and Bonkowski Patent 3,134,485 dated May 26, 1964, for example, involve complex and relatively costly designs. When compared to the present invention, many of the heretofore available packaging units lack simplicity and require excessive numbers of parts to construct the package arrangements. For these as well as other reasons only a few of the prior packaging units have met with any substantial degree of commercial success.

Accordingly, it is an object of the present invention to provide a highly reliable and relatively inexpensive article for positioning plural cylindrical containers in a package.

Another object of the present invention is to provide a highly reliable package that maintains a plurality of cylindrical containers in orderly parallel array.

SUMMARY OF THE INVENTION

In accordance with the present invention, a unitary molded article having a uniform thickness throughout comprises a substantially rectangular sheet with a pair of integrally molded depressions formed therein. Each depression is spaced from the other along the longitudinal centerline of the sheet and includes a bottom wall spaced from and parallel to the plane of the sheet and a side wall that extends from the bottom wall to the plane of the sheet. Each side wall has a diamond-shaped configuration with one of the diagonals of the diamond coinciding with the longitudinal centerline of the sheet and an aperture is provided in the bottom wall of each depression. Moreover, the side wall of each depression has four arcuate segments each of which curves inwardly toward the center of the depression formed thereby.

The present invention also involves a package comprising six similar cylindrical containers in two parallel rows of three containers each with an upper molded positioner adjacent the tops of the containers and, in many instances, a lower positioner adjacent the container bottoms. Each of the positioners includes a sheet of generally rectangular overall configuration with a pair of integrally molded depressions formed therein and spaced from each other along the longitudinal centerline of the sheet. Each depression extends into the interior of the package between a group of four adjacent containers. An outerwrap of flexible transparent film is disposed around the containers and the positioners to maintain these elements in assembled relationship. A finger grip opening is located in the bottom wall of each depression in the upper positioner, and portions in the outerwrap permit access to the finger grip openings so that the package can be handled easily.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

FIGURE 1 is a perspective view of a package according to the present invention;

FIGURE 2 is a top plan view of a molded container positioner according to the present invention;

FIGURE 3 is a sectional elevational view taken along line 3—3 of FIGURE 2;

FIGURE 4 is a sectional elevational view taken along line 4—4 of FIGURE 2;

FIGURE 5 is a top plan view of the package illustrated in FIGURE 1;

FIGURE 6 is a sectional elevational view taken along line 6—6 of FIGURE 5; and

FIGURE 7 is a sectional view taken along line 7—7 of FIGURE 5.

DETAILED DESCRIPTION OF THE INVENTION

Referring in more particularity to the drawing, a molded pulp positioner as illustrated in FIGURES 2–4 may be formed as a unitary article 10 manufactured according to known pulp slurry deposition processes to provide a sheet 12 of substantially uniform thickness throughout. Although the article is described throughout as molded of fibrous pulp material other materials such as thermoplastic or thermosetting resins, either foamed or unfoamed, are equally suitable, for example, foamed or unfoamed polyethylene or polystyrene. The sheet 12 has a substantially rectangular overall configuration with rounded corners, as shown in FIGURE 2. A pair of depressions 14, 16 are integrally molded in the sheet with each depression spaced from the other along the longitudinal centerline 18 of the sheet. Each depression includes a bottom wall portion 20 spaced from and parallel to the plane of the sheet, and a side wall portion 22 that surrounds the bottom wall and extends to the plane of the sheet. As shown, for example, in FIGURE 2, each side wall portion 22 has a diamond-shaped configuration with one of the diagonals of the diamond coinciding with the longitudinal centerline 18. The bottom wall of each depression includes an aperture 24 to facilitate manipulation of the package in which the positioner is utilized. As explained more fully below, the depressions 14, 16 of the molded pulp positioner 10 are adapted to lie between groups of adjacent containers in the package.

The side wall portion 22 of each depression includes four arcuate segments 26 connected together at their ends to form the diamond-shaped configuration of the side wall. Each segment is curved inwardly toward the center of the depression so that the cylindrical surface of a container in contact with one of the arcuate segments is snugly engaged by that segment. The depressions are spaced apart, in the illustrated embodiment, a distance approximately equal to the diameter of a cylindrical container to be packaged in connection with the positioner.

FIGURES 5-7 illustrate a pair of the above described positioners 10. These positioners cooperate with a plurality of similar cylindrical containers 28 and a heat shrinkable flexible transparent film 30 that surrounds the positioners and the containers confined therebetween to form a package 32. As shown in FIGURE 5, the package comprises six cylindrical containers in two parallel rows with three containers in each row. One of the molded pulp positioners serves as the upper positioner for the package where it substantially covers the tops of the containers. The other or lower positioner is provided to cover and space the container bottoms.

As explained above, each positioner has a pair of diamond-shaped depressions 14, 16 formed therein along the longitudinal centerline 18 of the sheet 12. Each depression has a bottom wall 20 and a diamond-shaped side wall 22 formed by four arcuate segments 26 that curve inwardly toward the center of the depression.

In forming the package 32 the lower molded pulp positioner is supported on a plane surface so that the depressions extend in an upward direction. The six containers to be packaged are then placed in two parallel rows of three containers each on top of the lower positioner. As readily understood, each of the four containers that occupy the corners of the package engages one of the arcuate segments forming the side wall portions of the depressions while the two inner containers engage two of the arcuate segments, one of each depression. With the containers so positioned, the upper positioner is placed on the tops of the containers so that each depression in that positioner extends into the interior of the package between a group of four adjacent containers. The containers in the package engage the arcuate segments of the side walls of the depressions in the upper positioner in the same manner as described above in conjunction with the lower positioner. Finally, the upper and lower positioners and the containers confined therebetween are enveloped by the heat shrinkable transparent film 30 which may take any suitable form. One suggested arrangement is a bag opened at one end thereof. The bag in its open position is arranged to receive the containers and positioners and is ultimately heat shrunk so that it snugly engages these elements.

A heated punch may be provided to melt away portions 34 of the flexible overwrap directly above the depressions in the upper positioner, in the known manner. This expedient provides access to a pair of finger grip openings 36 formed by the apertures 24 in the bottom wall of the depressions. Thus, the overall package can be easily manipulated by inserting the fingers of one hand into the openings, as illustrated in FIGURE 6.

What is claimed is:

1. A unitary molded article of uniform thickness throughout comprising a substantially rectangular sheet having at least one pair of integrally molded depressions formed therein and spaced from one another along the longitudinal centerline of the sheet, each depression including a bottom wall spaced from and parallel to the plane of the sheet and a side wall that extends from the bottom wall to the plane of the sheet, each side wall having a diamond-shaped configuration with one of the diagonals of the diamond coinciding with the longitudinal centerline of the sheet, the side wall of each depression including four arcuate segments with each segment curving inwardly toward the center of the depression and having a curvature of less than 90°, and an aperture in the bottom wall of each depression.

2. A package comprising six similar cylindrical containers in two parallel rows of three containers each, a molded positioner adjacent the tops of the containers including a sheet of generally rectangular overall configuration with a pair of integrally molded depressions formed therein and spaced from one another along the longitudinal centerline of the sheet, each depression extending into the interior of the package between a group of four adjacent containers, and an outerwrap of flexible film surrounding the positioner and the containers, each depression comprising a bottom wall spaced from and parallel to the plane of the sheet from which it is depressed and a side wall that extends from the bottom wall to the plane of that sheet, each side wall having a diamond-shaped configuration with one of the diagonals of the diamond coinciding with the longitudinal centerline of the sheet in which it is formed, and each diamond-shaped side wall having four arcuate segments curving inwardly toward the center of the depression and having a curvature of less than 90° whereby container portions in contact with the arcuate segments are snugly engaged by these segments and adjacent containers abut one another.

3. A package as in claim 2 including a finger grip opening in the bottom wall of each depression in the positioner and portions in the outerwrap permitting access to the finger grip openings.

4. A package as in claim 2 wherein a second molded positioner identical to the other positioner is located adjacent the bottoms of the containers in the package.

References Cited

UNITED STATES PATENTS

| 2,314,198 | 3/1943 | DeReamer | 206—65 |
| 3,198,327 | 8/1965 | Boehling et al. | 206—65 |

WILLIAM T. DIXON, Primary Examiner

U.S. Cl. X.R.

217—26